UNITED STATES PATENT OFFICE.

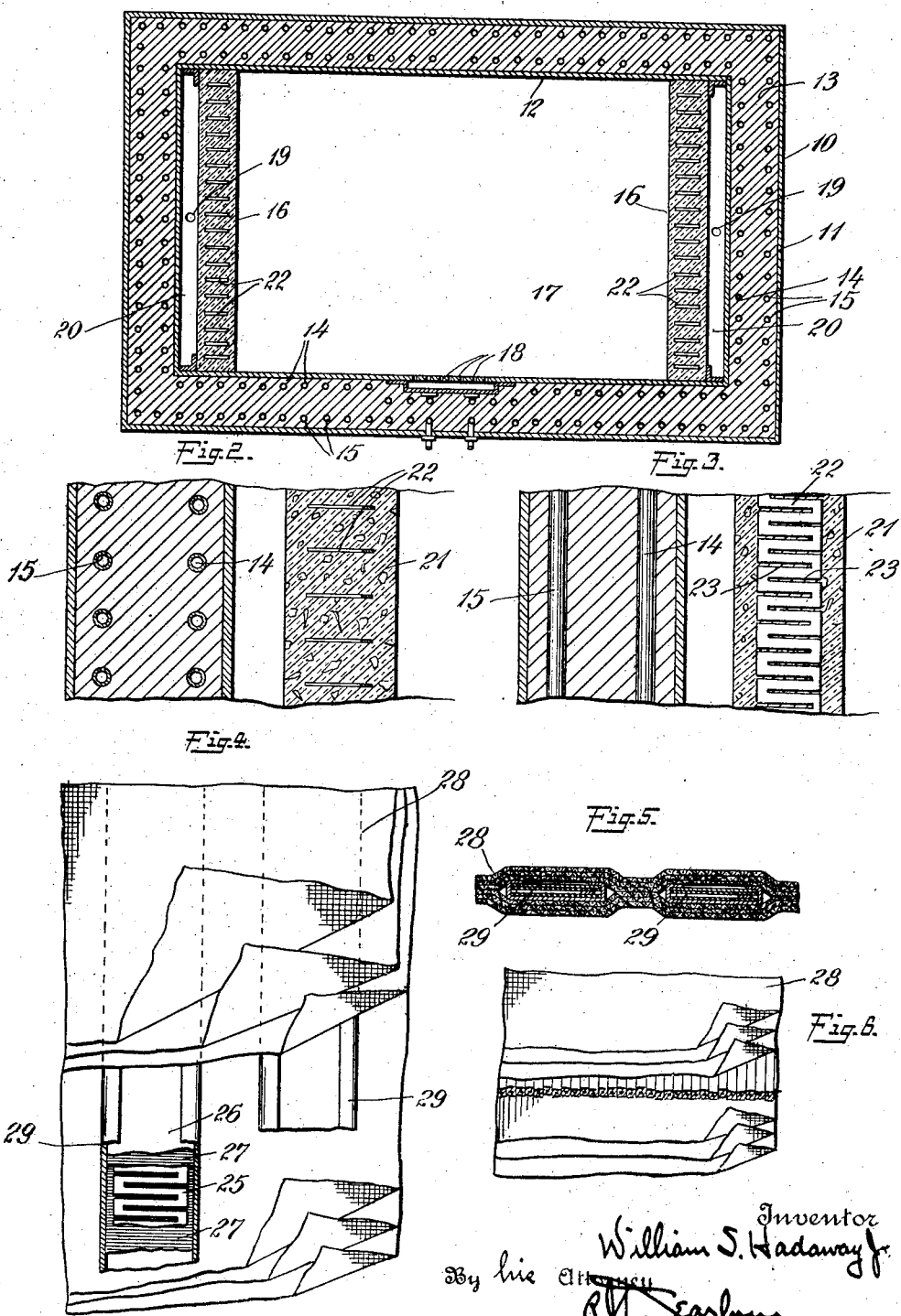

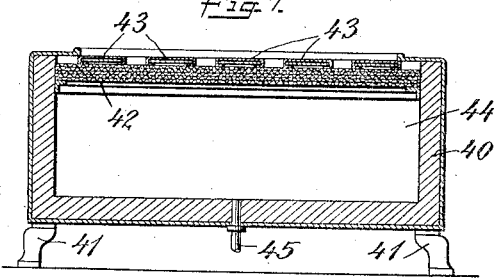
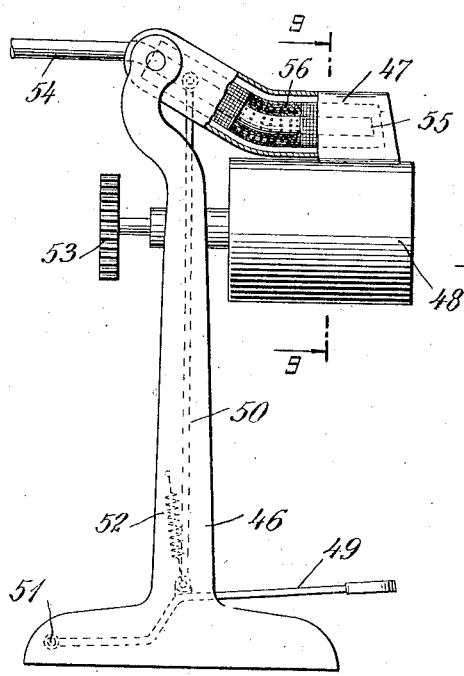
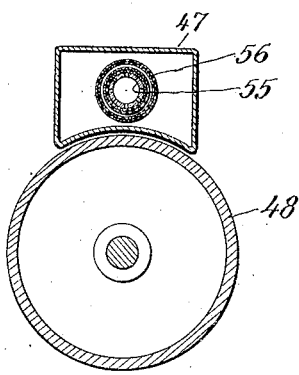
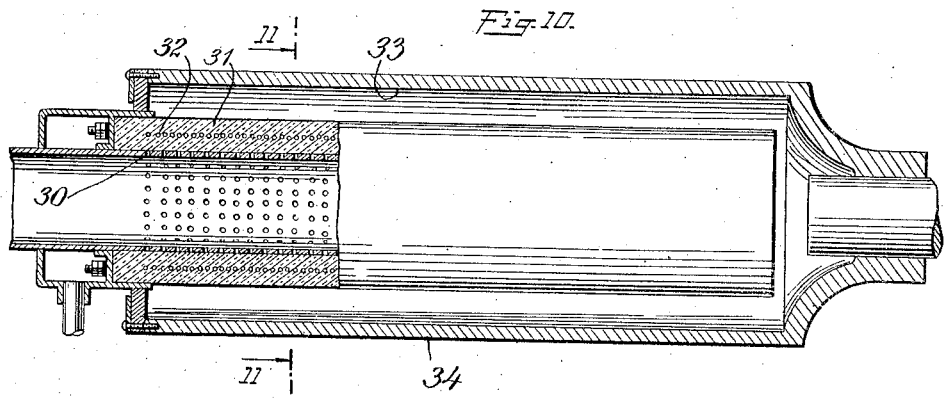
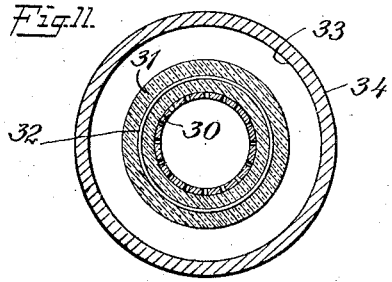

WILLIAM S. HADAWAY, JR., OF NEW ROCHELLE, NEW YORK.

HEATING APPARATUS.

1,349,131.     Specification of Letters Patent.     Patented Aug. 10, 1920.

Application filed March 4, 1916, Serial No. 82,070. Renewed November 15, 1919. Serial No. 338,329.

*To all whom it may concern:*

Be it known that I, WILLIAM S. HADAWAY, Jr., a citizen of the United States of America, and a resident of New Rochelle, Westchester county, and State of New York, have invented certain new and useful Improvements in Heating Apparatus, of which the following is a specification, reference being had to the accompanying drawings, forming a part thereof.

My invention relates to electric heating apparatus and has special reference to electro-responsive means for producing high temperature heat in conjunction with a hot vapor such as steam for example.

One object of my invention is to provide a simple and durable heater of the aforesaid character that shall be adapted to readily conduct steam or other vapor and which at the same time shall be adapted to act in conjunction therewith, to materially increase the temperature of the useful heat delivered.

Another object is to provide a heater body for the aforesaid purpose having a relatively large heat capacity, adapted to permit the flow of steam or other vapor through it, and that shall embody electric heating elements arranged and adapted to superpose its heating effect whereby the steam becomes a vehicle for carrying forward heat at a temperature which is high relative to the initial temperature of the steam, the quantity of useful heat delivered being great relative to the electrical energy expended.

Still another object of my invention is to provide a porous body of relatively large heat capacity in which electric heating elements are embedded, the arrangement being such that steam slowly percolates through the body and, at the same time, is materially increased in temperature.

In my copending application Serial No. 82,067, filed of even date herewith, I have shown and described a heating apparatus comprising an oven having electric heaters which embody my present invention and illustrate one field of usefulness to which it is applicable. However, it will of course be understood that my invention is by no means limited in this respect and is capable of a wide variety of uses, some of which are illustrated herein.

Other objects and advantages of my invention will be set forth hereinafter, and in order that my invention may be thoroughly understood, I will now proceed to describe the same in the following specification, and then point out the novel features thereof in appended claims.

Referring to the drawings:

Figure 1 is a sectional elevation of an oven equipped with electric heaters which are arranged and constructed in accordance with my invention.

One of the electric heaters is shown more in detail in Figs. 2 and 3 which are fragmentary sections taken at right angles to each other.

A modified heater structure which also embodies my invention, is shown in partially sectional plan view in Fig. 4, and in section in Fig. 5.

Another modified heater structure is shown in Fig. 6 which corresponds to Fig. 4, and is well adapted for use in a heater of the form shown in Figs. 8 and 9.

Fig. 7 shows a stove having a heater which is similar to that of Figs. 4 and 5.

Figs. 8 and 9 show the structure of Fig. 6 applied to a laundry press.

Still another modification of my invention is shown in Figs. 10 and 11 of which Fig. 10 is a partially sectional elevation, and Fig. 11 is a transverse sectional view.

Reference may first be had to Figs. 1, 2 and 3, in which 10 represents an oven having an outer shell 11, an inner shell 12, interposed heat insulation designated 13, condensation heaters 14 and 15 and vapor heaters 16.

The condensation heaters 14 are in the form of bent tubes or pipes which are adapted to receive steam from the oven chamber 17 through outer passages 18, tubes 14 on their ends are connected with tubes 15 which are disposed near the outer shell 11 of the oven, steam is admitted through inlet openings 19 from compartments 20 which are divided off from chamber 17 of the oven, by the vapor heaters 16.

Each of the vapor heaters as shown in Figs. 2 and 3, comprises a porous mass of fireclay or other suitable material which is designated 21 and in which is embedded electric heater elements 22. These elements may be formed in any suitable manner; for example, each element may comprise a resistance ribbon having a plurality of transverse slots 23 cut alternately from opposite edges to produce a zig-zag path for the electric current.

The body 21 may be formed by mixing fireclay with sawdust and baking until the clay is thoroughly hardened and the sawdust destroyed leaving small cavities.

A structure of this kind has a relatively large heat capacity and permits steam to readily percolate through it; at the same time, the electric heater elements when energized raise the body to any desired temperature so that the steam in passing through it is likewise heated, thus the temperature of the steam is boosted or increased and it is delivered into the oven chamber 17 in the structure illustrated, or otherwise is in condition to be utilized.

The steam, of course, may be produced in any suitable manner or in fact the heater may be utilized for heating gases or vapors which are such at ordinary temperatures. On the other hand, it may be utilized for increasing the temperature of steam, which has already been superheated as in my copending application to which reference has already been made.

But it is not essential that the body 21 be formed of fireclay or other material which is an electrical insulator for as shown in Figs. 4 and 5 it may be formed of wire screen of various mesh massed together in such a way as to allow steam to pass through it slowly. Of course in utilizing a metal structure of this kind, the electric heater elements are necessarily insulated, and I prefer to utilize a heater member of the so-called armored type; for example, a resistance ribbon 25 corresponding to the ribbon 22 may be sealed into a metal jacket 26 with thin strips 27 of insulating material interposed. In the figures,—28 designates the metallic body formed of screen or the like, and 29 designates the armored heating members embedded therein.

Instead of using the armored heating element 26, as shown in Fig. 4, an armored resistance wire may be utilized as shown in Fig. 6.

In Fig. 7 I have shown a stove which embodies my invention and comprises an insulated box or casing 40 which may be supported on legs 41, and a cover member or top 42 which has relatively large heat capacity and may, for example, be formed of wire screen as the mass 28 of Fig. 4. Mounted upon this porous mass are a plurality of armored heating units 43 of any suitable character. Steam is admitted to the hollow chamber 44 of the box through a pipe 45 and follows upwardly through the porous mass 42. The mass is thus heated to a predetermined temperature which constitutes a working level from which the electric heating elements build up the temperature of the useful heat.

The heated mass 42 serves the very useful purpose of most effectively preventing the loss of heat from the electric heater elements 43 which would otherwise occur in a downward direction and furthermore, the hot vapor serves as a heat vehicle for transferring not only its own useful heat but also heat which it may receive from the electric heating elements.

The adaptability of my invention is further illustrated in Figs. 8 and 9, which show a heater of irregular form having a circular section as applied to a collar and cuff machine, hereinafter referred to as a laundry press. The press illustrated comprises a base 46, a press head 47 pivotally connected to the base at its upper end, and a drum or roll 48 which coöperates with the press. The press head is connected to a foot lever 49 by a link 50, the lever being pivoted at 51 on the base and being pressed downwardly in opposition to a spring 52 whenever it is desired to throw the press head into operative engagement with the roll. The gear wheel 53 indicates suitable means for turning the roll. The spring 52 serves in a well known manner to hold the press head away from the roll to a slight distance, except when the foot lever is actuated.

The press head 47 is hollow and a steam pipe 54 is bent to extend into it, as clearly shown in Fig. 8. The pipe is closed at its end 55 and is perforated within the head so that the steam is free to escape. Surrounding the steam pipe is a mass 56 having large heat capacity and conveniently formed of screen closely wrapped upon the pipe. Embedded in the screen are armored electric heating elements which may be formed in any suitable manner,—for example, either as shown in Fig. 4 or Fig. 6. The flexibility of the steam pipe 54, is sufficient to permit all the necessary movement of the head.

The structure of Figs. 10 and 11 is tubular in form and comprises a perforated pipe 30 on which a porous mass 31 of fireclay or some other suitable material is mounted. Embedded in this mass is an electric heater 32 which may conveniently be in the form of a helix of resistance wire.

If the body 31 is formed of fireclay, and corresponds to the body 21, the resistance wire may be embedded in it directly as shown, but on the other hand, if it is formed of wire screen, for example, it may be wound around the pipe 30 or otherwise mounted upon it, but the resistance element will necessarily be insulated in some suitable manner and may correspond to the element shown in Fig. 6.

The tubular structure is well adapted for use as indicated in Fig. 10, as a heater for laundry rolls, the steam being admitted through the pipe 30 from any suitable source (not shown) and flowing outwardly from the pipe through the pores of the body 31, and being discharged against the inner surface 33 of the laundry roll 34.

The structure shown and described may be modified in various ways without departing from the spirit and scope of my invention, and I intend that only such limitations be imposed as are indicated in the appended claims.

What I claim is:

1. A heater comprising a chamber constituting a source of heated gas, a working chamber to which hot gas is supplied, an interposed porous mass through which the gas percolates to the working chamber, and electric heater elements embedded in the porous mass.

2. A heater comprising a chamber constituting a source of heated gas, a working chamber to which hot gas is supplied, an interposed unitary porous mass through which the gas percolates to the working chamber, and electric heater elements embedded in the porous mass and electrically separated therefrom and from the gas.

3. A heater comprising a chamber constituting a source of heated gas, a working chamber to which the gas is supplied and an interposed porous metallic mass having large heat capacity and through which the gas percolates from the source to the working chamber, and electric heating elements embedded in the porous mass.

4. A heater comprising a chamber constituting a source of heated gas, a working chamber to which the gas is supplied and an interposed porous metallic mass having large heat capacity and through which the gas percolates from the source to the working chamber, and electric heating elements embedded in the porous mass and adapted to impart heat thereto whereby the heat of the mass is transferred to the gas.

5. A heater comprising a porous metallic mass having insulated electric heaters associated therewith, and means for causing vapor to pass through the pores of the metallic mass.

6. A heater comprising a metallic mass of large heat capacity having insulated electric heaters embedded therein for raising the temperature of the metallic mass and adapted to permit the passage of vapor therethrough.

7. A heater comprising a metallic mass having insulated armored electric heaters embedded therein, and adapted to permit the passage of vapor therethrough.

8. A tubular heater comprising a tubular porous body having an interior vapor passage, and heater elements disposed in the body and adapted to heat the vapor as it passes through the pores of the body.

9. A heater comprising a tubular body having a perforated pipe to receive vapor, and a mass of porous material mounted thereon and electric heater elements embedded in said mass.

10. A heater comprising a tubular body having a perforated pipe to receive vapor and a mass of porous material mounted thereon, and electric heater elements associated with said mass.

11. A heater comprising a hollow perforated support adapted to be supplied with steam, a porous mass of large heat capacity mounted thereon, and electric heater elements adapted to produce useful heat in conjunction with the steam flowing through the porous mass.

12. A heater comprising a hollow perforated pipe constituting a support and adapted to be supplied with steam, a porous mass of large heat capacity mounted on the pipe and electric heater elements associated with the porous mass and adapted to produce useful heat, the temperature of which is built up from the level established by the steam.

13. A heater comprising a mass adapted to permit vapor to pass therethrough, electric heaters for imparting heat to the mass, and means for causing the vapor to pass through the mass.

14. A heater comprising a porous mass adapted to permit vapor to pass therethrough, electric heaters for imparting heat to the mass, and means for causing vapor to pass through the pores of the mass.

In witness whereof, I have hereunto set my hand this 29 day of February, 1916.

WILLIAM S. HADAWAY, Jr.